United States Patent
Lamberger et al.

(10) Patent No.: US 12,021,973 B2
(45) Date of Patent: Jun. 25, 2024

(54) SYSTEM AND METHOD FOR POST-QUANTUM TRUST PROVISIONING AND UPDATING WITH CONTEMPORARY CRYPTOGRAPHY

(71) Applicant: NXP B.V., Eindhoven (NL)

(72) Inventors: Mario Lamberger, Graz (AT); Christine Van Vredendaal, Veldhoven (NL); Markus Hinkelmann, Halstenbek (DE); Hauke Meyn, Krempermoor (DE); Alexander Vogt, Hamburg (DE)

(73) Assignee: NXP B.V., Eindhoven (NL)

( * ) Notice: Subject to any disclaimer, the term of this patent is extended or adjusted under 35 U.S.C. 154(b) by 267 days.

(21) Appl. No.: 17/587,868

(22) Filed: Jan. 28, 2022

(65) Prior Publication Data

US 2023/0246815 A1    Aug. 3, 2023

(51) Int. Cl.
*H04L 9/08*      (2006.01)

(52) U.S. Cl.
CPC .......... *H04L 9/0825* (2013.01); *H04L 9/0891* (2013.01)

(58) Field of Classification Search
CPC ... H04L 9/0852; H04L 9/0825; H04L 9/0894; H04L 9/0891
See application file for complete search history.

(56) References Cited

U.S. PATENT DOCUMENTS

| | | | | |
|---|---|---|---|---|
| 6,038,318 | A * | 3/2000 | Roden | G06F 7/723 708/277 |
| 11,218,301 | B1 | 1/2022 | Shea et al. | |
| 11,336,462 | B1 * | 5/2022 | Maganti | H04L 9/0656 |
| 11,727,310 | B1 * | 8/2023 | Arbajian | H04L 9/3247 706/12 |

(Continued)

FOREIGN PATENT DOCUMENTS

| | | |
|---|---|---|
| DE | 102021001919 A1 | 7/2021 |
| WO | 2010045823 A1 | 4/2010 |
| WO | 2021087221 A1 | 4/2010 |

OTHER PUBLICATIONS

Tanizawa, "Communication Device, Communication System and Communication Method", Mar. 1, 2018, JP 2018033079 A (English Translation), pp. 1-46 (Year: 2018).*

(Continued)

*Primary Examiner* — Jonathan A Bui

(57) ABSTRACT

Various embodiments relate to a system for provisioning a cryptographic device, including: a memory; a processor coupled to the memory, wherein the processor is further configured to: determine a maximum PQC private key size, maximum PQC public key size, and maximum PQC updater size of a plurality of post quantum cryptography algorithms; provision memory in the cryptographic device to store a PQC-update non-PQC private key, a secret PQC-update non-PQC public key, PQC private key, PQC public key, and PQC updater based upon the determined maximum PQC private key size, maximum PQC public key size, and (Continued)

maximum updater size; and provision the cryptographic device with the PQC-update non-PQC private key, the secret PQC-update non-PQC public key, a non-PQC secret key, a non-PQC public key, and non-PQC algorithm code configured to carry out non-PQC cryptographic algorithms.

20 Claims, 2 Drawing Sheets

(56) References Cited

U.S. PATENT DOCUMENTS

| | | | |
|---|---|---|---|
| 2018/0270045 | A1 | 9/2018 | Almuhammadi et al. |
| 2020/0280436 | A1 | 9/2020 | Nix |
| 2021/0089507 | A1* | 3/2021 | Prasad ............... G06F 16/2255 |
| 2021/0119789 | A1 | 4/2021 | Ghosh et al. |
| 2021/0226777 | A1 | 7/2021 | Wilson |
| 2022/0038269 | A1* | 2/2022 | Nix ...................... H04L 9/0838 |
| 2023/0306142 | A1* | 9/2023 | Meinholz ............. G06N 10/00 |

OTHER PUBLICATIONS

U.S. Appl. No. 17/587,903; Inventor Christine van Vredendaal, et al.; "System And Method For Flexible Post-Quantum Trust Provisioning And Updating;"; Filed Jan. 28, 2022.

Jan-Pieter D'Anvers, Angshuman Karmakar, Sujoy Sinha Roy, Frederik Vercauteren, Jose Maria Bermudo Mera, Michiel Van Beirendonck, and Andrea Basso, SABER, Tech. report, National Institute of Standards and Technology, 2020, available at https://csrc.nist.gov/projects/post-quantum-cryptography/round-3-submissions.

David Cooper, Daniel Apon, Quynh Dang, Michael Davidson, Morris Dworkin, and Carl Miller, Recommendation for stateful hash-based signature schemes, Oct. 29, 2020, 2020.

National Institute of Standards and Technology, Post-quantum cryptography standardization, Dec. 2016 https://csrc.nist.gov/Projects/Post-Quantum-Cryptography/, Post-Quantum-Cryptography-Standardization.

Peter Schwabe, Roberto Avanzi, Joppe Bos, Léo Ducas, Eike Kiltz, Tancrède Lepoint, Vadim Lyubashevsky, John M. Schanck, Gregor Seiler, and Damien Stehlé, Crystals-Kyber, Tech. report, National Institute of Standards and Technology, 2020, available at https://csrc.nist.gov/projects/post-quantum-cryptography/round-3-submissions.

Xie, Jiafeng et al.; "Special Session: The Recent Advance in Hardware Implementation of Post-Quantum Cryptography"; 2020 IEEE 38th VLSI Test Symposium (VTS); Apr. 5-8, 2020, San Diego, California; DOI: 10.1109/VTS48691.2020.9107585.

Potter, John M.; "A Quantum Resistant Strategy From XTRABYTES™"; Published in XTRABYTES Today, Jan. 30, 2020; https://medium.com/xtrabytes-tech/a-quantum-resistant-strategy-from-xtrabytes-9e3dfdce9d58.

WikipediA; "Post-quantum cryptography;" as edited by ZaniGiovanni (talk | contribs); Dec. 23, 2021; https://en.wikipedia.org/w/index.php?title=Post-quantum_cryptography&oldid=1061715689.

Non-Final Office Action mailed Mar. 15, 2024 for U.S. Appl. No. 17/587,903, 70 Pages.

* cited by examiner

SYSTEM AND METHOD FOR POST-QUANTUM TRUST PROVISIONING AND UPDATING WITH CONTEMPORARY CRYPTOGRAPHY

TECHNICAL FIELD

Various exemplary embodiments disclosed herein relate generally to a system and method for post-quantum trust provisioning and updating with contemporary or non post-quantum cryptography.

BACKGROUND

In a Trust Provisioning (TP) process, sensitive data and in particular secret keys, key material, and secret assets are installed in the (secure) memory of a device after its production. Generally one or many RSA/ECC key-pairs are created for public key cryptography. Additionally, symmetric keys can be provisioned for use in the field. Devices provisioned in the field now, along with their keying material, may be used in the field for a very long time (up to 20 years or more).

A threat to this PKI provisioning system are the advances being made in quantum computing. A full-scale quantum computer is believed to be able to recover RSA/ECC secret keys from their public counterparts or even from messages digitally signed with that keypair, and thereby removing the security of the provisioned devices because the user is no longer able to trust the keys and the cryptography protecting critical operations of the device. To secure future devices, efforts are going into post-quantum cryptography (PQC), i.e., public key cryptography that can withstand attacks even by a quantum adversary. Standardization bodies such as the National Institute of Standards and Technology (NIST) are working towards standardizing a set of schemes that are recommended to be used.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

A system for provisioning a cryptographic device, including: a memory; a processor coupled to the memory, wherein the processor is further configured to: determine a maximum PQC private key size, maximum PQC public key size, and maximum PQC updater size of a plurality of post quantum cryptography algorithms; provision memory in the cryptographic device to store a PQC-update non-PQC private key, a secret PQC-update non-PQC public key, PQC private key, PQC public key, and PQC updater based upon the determined maximum PQC private key size, maximum PQC public key size, and maximum updater size; and provision the cryptographic device with the PQC-update non-PQC private key, the secret PQC-update non-PQC public key, a non-PQC secret key, a non-PQC public key, and non-PQC algorithm code configured to carry out non-PQC cryptographic algorithms.

Various embodiments are described, wherein the processor is further configured to: generate the PQC private key and the PQC public key; and transmit the PQC private key and the PQC public key to the cryptographic device, wherein the PQC private key and the PQC public key are encrypted using a public key associated with the PQC-update non-PQC secret key.

Various embodiments are described, wherein the processor is further configured to: receive a key acknowledgement message from the cryptographic device.

Various embodiments are described, wherein the processor is further configured to: transmit a PQC updater to the cryptographic device, wherein the PQC updater is configured to implement PQC algorithms in the cryptographic device, wherein the PQC updater is encrypted using a public key associated with the secret PQC-update non-PQC public key.

Various embodiments are described, wherein the processor is further configured to: receive a PQC enabled message from the cryptographic device that indicates that the cryptographic device has been successfully enabled to carry out PQC algorithms.

Various embodiments are described, wherein the processor is further configured to: receive a non-PQC disabled message from the cryptographic device.

Various embodiments are described, wherein the PQC-update non-PQC private key is a symmetric encryption key.

Various embodiments are described, wherein the PQC-update non-PQC private key is an asymmetric encryption key.

Various embodiments are described, wherein provisioning memory in the cryptographic device to store a PQC-update non-PQC private key, a secret PQC-update non-PQC public key, PQC private key, PQC public key, and PQC updater based upon the determined maximum PQC private key size, maximum PQC public key size, and maximum updater size includes provisioning memory in the cryptographic device to store a plurality of PQC private keys and PQC public keys.

Various embodiments are described, wherein the processor is further configured to: determine a maximum key generation seed size; provision memory in the cryptographic device to store a key generation seed based upon the determined maximum key generation seed size; transmit a key generator to the cryptographic device, wherein the key generator is configured to generate the PQC private key and PQC public key based upon the key generator seed, wherein the key generator is encrypted using a public key associated with the PQC-update non-PQC private key; and transmit a PQC updater to the cryptographic device, wherein the PQC updater is configured to implement PQC algorithms in the cryptographic device, wherein the PQC updater is encrypted using the PQC-update non-PQC public key.

Further various embodiments relate to a cryptographic system, including: a memory including a secure portion; a processor coupled to the memory, wherein the processor is further configured to: receive a memory provisioning request from a backend system including a PQC-update non-PQC private key size, a secret PQC-update non-PQC public key size, PQC private key size, PQC public key size, and PQC updater size; provision memory in the secure portion to store a PQC-update non-PQC private key, a secret PQC-update non-PQC public key, a PQC private key, a PQC public key, and an PQC updater based upon the received PQC-update non-PQC private key size, received secret PQC-update non-PQC public key size, received PQC private key size, received PQC public key size, and received PQC updater size; receive a non-PQC provisioning request from the backend system including a PQC-update non-PQC private key, secret PQC-update non-PQC public key, non-PQC private key, non-PQC public key, and non-PQC updater; and provision memory in the secure portion using the non-PQC updater with the PQC-update non-PQC private key, the secret PQC-update non-PQC public key, non-PQC secret key, the non-PQC public key, and the non-PQC algorithm code configured to carry out non-PQC cryptographic algorithms.

Various embodiments are described, wherein the processor is further configured to: receive a PQC private key and a PQC public key from the backend system, wherein the PQC private key and the PQC public key are encrypted using a public key associated with the secret PQC-update non-PQC private key.

Various embodiments are described, wherein the processor is further configured to: transmit a key acknowledgement message to the backend system.

Various embodiments are described, wherein the processor is further configured to: receive a PQC updater from the backend system, wherein the PQC updater is configured to implement PQC algorithms in the cryptographic device and the PQC updater is encrypted using a public key associated with the secret PQC-update non-PQC private key; and execute the PQC updater to implement the PQC algorithms.

Various embodiments are described, wherein the processor is further configured to: transmit a PQC enabled message to the backend system that indicates that the cryptographic device has been successfully enabled to carry out PQC algorithms.

Various embodiments are described, wherein the processor is further configured to: disable the non-PQC secret key, the non-PQC public key, and the non-PQC algorithm code; and
transmit a non-PQC disabled message from the cryptographic device.

Various embodiments are described, wherein the PQC-update non-PQC private key is a symmetric encryption key.

Various embodiments are described, wherein the PQC-update non-PQC private key is an asymmetric encryption key.

Various embodiments are described, wherein provisioning memory in the secure portion to store a PQC-update non-PQC private key, a secret PQC-update non-PQC public key, a PQC private key, a PQC public key, and an PQC updater based upon the received PQC-update non-PQC private key size, received secret PQC-update non-PQC public key size, received key generation seed size, received PQC private key size, received PQC public key size, and received PQC updater size includes provisioning memory in the cryptographic device to store a plurality of PQC private keys, and PQC public keys.

Various embodiments are described, wherein the processor is further configured to: receive a memory provisioning request from the backend system including a maximum key generation seed size; provision memory in the secure portion to store a key generation seed based upon the determined maximum key generation seed size; receive a key generator from the backend system, wherein the PQC updater is encrypted using a public key associated with the PQC-update non-PQC private key; execute the key generator to generate the PQC private key and PQC public key based upon the key generator seed; and receive a PQC updater to the cryptographic device, wherein the PQC updater is encrypted using the public key associated with the ECC non-PQC private key; and execute the PQC updater to implement PQC algorithms in the cryptographic device.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
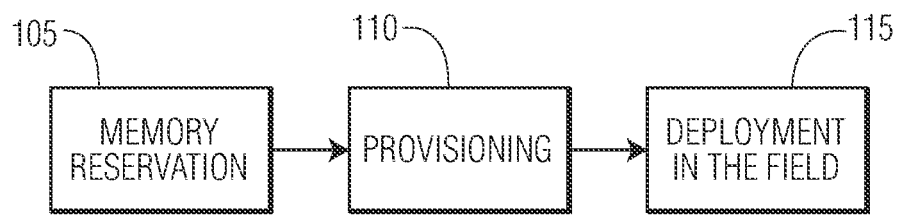
FIG. 1 illustrates the provisioning method for a cryptographic device and deployment of the cryptographic device.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Recently, NIST standardized hash-based signatures which are post-quantum resistant, but, due to the need of maintaining a state, are not useful for all use-cases. Key updateability mechanisms exist, but cannot simply update to post-quantum algorithms with the existing updater. Because this updater protects the integrity and authenticity of its updates with pre-quantum keys, an attacker can simply take the known public key, recover the secret key, and breach the confidentiality or forge a signature. Even if the assumption is made that this occurs after the first cryptographically relevant quantum computer, but before large-scale availability, an adversary could record the transaction and later read the contents in order to break confidentiality. Additionally, the updaters are designed to update an advanced encryption standard (AES)/elliptic curve cryptography (ECC)/Rivest-Shamir-Adleman (RSA) key to the same type of key. In the case where these contents consist of new post-quantum cryptography (PQC) private or public keys, this may result in various problems. In-the-field-updating to PQC keys comes with a list of challenges including: it is unclear to which PQC algorithm the devices will be updated because there is ongoing development and standardization of PQC algorithms; PQC keys are generally much larger than ECC/RSA keys and therefore they cannot simply be placed in the allocated RSA/ECC storage slots; updates are often a broadcast of one signed update to many devices and sending die-specific updates (with e.g. PQC keys) would pose a challenge; the size of PQC read-only memory (ROM) code for the updater mechanism is not negligible, and the new sign/verify components can take 100(s) kB of extra space;

and space is scarce on constrained devices. These various technical challenges will be addressed in the embodiments described herein.

Current application devices using cryptography might be in the field for decades. There is a possibility that during this time the usage of a quantum computer by an attacker becomes feasible. In response, PQC keys cannot now be provisioned, because it is unclear which PQC algorithms will be standardized or whether the algorithm details will change before standardization. At the same time, the cryptographic keys and an updater read only memory (ROM) code for PQC is large and on current devices cannot simply replace the ECC/RSA keys due to space constraints.

Embodiments of a post-quantum update method are described herein that leverages contemporary or non-PQC public key (PK) infrastructure to update a PQC-ready device to a PQC device. This is done in a flexible way that may be adapted to the specific PQC algorithm that is developed and used in the application device. Further, the method described herein securely provisions PQC keys to a device, while being able to manage the risk of the PQC algorithm that is to be used later and that is still unknown during the provisioning process.

First, an embodiment of a method for updating a device to one PQC encryption key pair with two potential algorithm choices will be described. Next, a description will be provided as to how to generalize to multiple PQC key pairs, multiple algorithm options, as well as other possible variations.

As an example, a device with a post-quantum keypair is to be provisioned, where it is uncertain whether it will be a KyberKFM-512 keypair or a LightSaber-r3 keypair. The current key sizes and the key generation seed size for these options are:

| Algorithm | Secret Key (sk) size (bytes) | Public Key (pk) size (bytes) | Key Generation Seed size (bytes) |
|---|---|---|---|
| KyberKEM-512 | 800 | 832 | 32 |
| LightSaber-r3 | 672 | 896 | 32 |

For RSA the key size is typically in the range of 128 to 512 bytes. For ECC the key size is typically in the range of 32 to 128 bytes. As seen in the table above, the storage required by the PQC examples are much greater.

FIG. 1 illustrates the provisioning method 100 for a cryptographic device and deployment of the cryptographic device. A device manufacturer or implementor first reserves 105 memory for the storage of the PQC secret key (PQC_SK_KFY), PQC public key (PQC_PK_KFY), PQC private ECC key (PQC_Private_ECC_SIGN_KFY), PQC public ECC key (PQC_Public_ECC_ENC_KFY), and the updater ROM space (PQC_OVERFLOW_SPACE). The space required for each of these items may be, for example, as follows:

PQC_SK_KFY—800 bytes;
PQC_PK_KFY—896 bytes;
PQC_Private_ECC_SIGN_KFY—32 bytes;
PQC_Public_ECC_ENC_KFY—32 bytes;
PQC_OVERFLOW_SPACE—100 kB.

It is noted that in this example, sufficient space is provisioned for either the KyberKFM-512 PQC algorithm or the LightSaber-r3 PQC algorithm. In this example, PQC_SK_KFY is set to 800 bytes to accommodate the larger secret key used by the KyberKFM-512 PQC algorithm. Further, PQC_PK_KFY is set to 896 bytes to accommodate the larger public key used by the LightSaber-r3 PQC algorithm. When the space is provisioned for the PQC public key, PQC secret key, the key generation key, and the updated ROM space, the maximum values for each of these parameters among the potential PQC algorithms is determined and then chosen as the value used to size the memory required for the various parameters. As a result, there is sufficient space available for a variety of different PQC algorithms to be provisioned in the future. Further 32 bits will be reserved for 256 bit private and public ECC keys that will be used as part of the PQC update.

In the above list, PQC_Private_ECC_SIGN_KEY and PQC_Public_ECC_ENC_KFY do not correspond to each other but are used for different purposes. PQC_Public_ECC_ENC_KFY is used for achieving confidentiality and PQC_Private_ECC_SIGN_KFY is used for authenticity. In this example, ECC (e.g. with ECIES for confidentiality) is used, but in other embodiments RSA or any other non-PQC cryptographic algorithm may be used. Note that if ECDSA or RSA-PKCS1.5 signatures are applied, knowledge of the signature leaks the ECC/RSA public key and therefore makes the communication vulnerable to an attacker who can intercept a single message/signature pair (ECDSA) or two such pairs (RSA PKCS1.5 signatures).

Note that for encryption, provisioning an AES key would achieve the same goals of enabling secure communication, however this cannot be used to sign messages and also requires a symmetric TP infrastructure.

Note that policy on most cryptographic chips is that public keys may be stored off-chip in an encrypted manner (e.g., using a cryptographic accelerator and assurance module (CRAM) to create a blob). Currently, this is often done with an inline-encryption engine that does not use post quantum-grade symmetric cryptography. For example, the Prince cipher is a fast method used to encrypt the public key for off-chip storage, but is not post quantum-safe. This means that a quantum attacker could extract the encrypted public key off-chip and recover the private key from the secret key with their quantum computer. Therefore, if the public key is stored off-chip in encrypted form, the public key MUST be protected close to the protection level of the secret key. When it is stored off-chip, it should be protected with, for example, AES-256 or similar encryption.

Next, the manufacturer or implementer provisions the cryptographic device 110. During Trust Provisioning the PQC_Public_ECC_ENC_KFY and PQC_Private_ECC_SIGN_KFY are provisioned to the device. Note that for the verification use case, just the PQC_Private_ECC_SIGN_KFY needs to be provisioned on-device. Both the PQC_Public_ECC_ENC_KFY and PQC_Private_ECC_SIGN_KFY are also stored by the manufacturer/implementor. In the case of an encryption key, the manufacturer/implementor would only need to store the PQC_Public_ECC_ENC_KFY. In this case the private key could also be generated on the device to be deployed. The other slots (i.e., PQC_PK_KFY, PQC_PK_KFY, and PQC_OVERFLOW_SPACE) remain empty and all slots should be protected from user access. Further, this provisioning needs to be performed in a secure environment, so an attacker cannot record the public key.

The provisioning step 110 will also include provisioning of a current or non-PQC cryptographic algorithm, for example, RSA or ECC. This provisioning will include the storing the code to carry out the non-PQC cryptographic algorithm and producing and storing the associated non-PQC secret and public cryptographic keys. In the examples herein, the current or non-PQC keys are ECC keys but other types of keys such as RSA may be used as well. These so called non-PQC keys are used to update the deployed device to a PQC capability and the may also be called PQC-update non-PQC keys. The PQC-update non-PQC keys are current asymmetric keys that are used with current asymmetric cryptography protocols.

Once the cryptographic device is provisioned, it may be deployed in the field 115.

The cryptographic device may include a hardware security module (HSM). The HSM may be a secure physical computing device that safeguards and manages cryptographic keys, performs encryption and decryption functions in support of secure communications, digital signatures, and strong authentication. The HSM may include specialized hardware processors optimized to efficiently carry out various cryptographic algorithms. Further, the HSM may include secure memory that protects cryptographic keys and other sensitive information and prevents tampering and unauthorized access of the secret material. The functions of the HSM may include: onboard secure cryptographic key generation; onboard secure cryptographic key storage, at least for the top level and most sensitive keys, which are often called master keys; key management; use of cryptographic and sensitive data material, for example, performing encryption or digital signature functions; and offloading application servers for complete asymmetric and symmetric cryptography.

Figure 2:
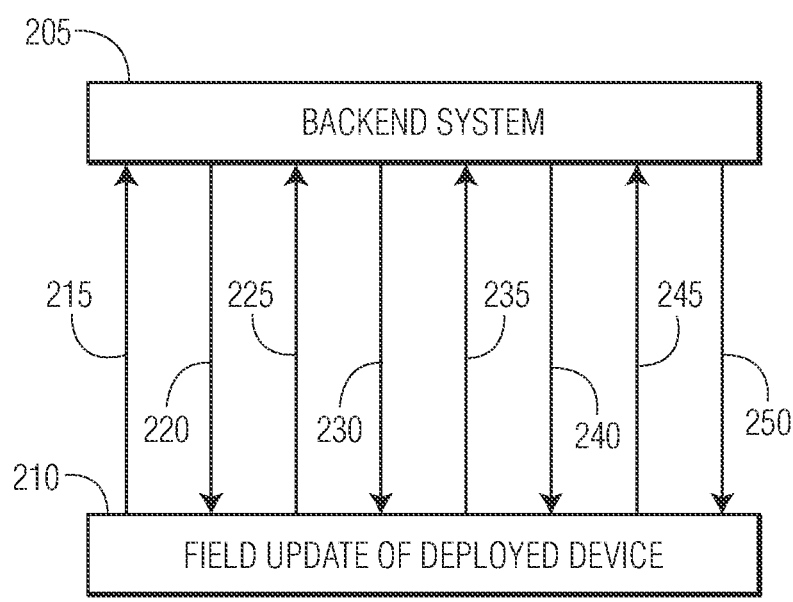
FIG. 2 illustrates the steps carried out between a deployed device in the field and a backend system.

FIG. 2 illustrates the steps carried out between a deployed device 210 in the field and a backend system 205. When the need to switch to a PQC updater arises (e.g., when the first large scale quantum computer would be available to an attacker), the deployed device 210 indicates 215 that is ready for a PQC update. In response, the backend system 205 then sends seeks to carry our a PQC update the of deployed device 205.

The PQC update may have two different options for updating the deployed device 210. The first option is simpler, but has the drawback of not allowing a broadcast solution. A second option that would allow a broadcast option will be described below.

In the first option, the backend server 210 will send 220 the PQC secret key PQC_SK_KFY and PQC public key PQC_PK_KFY, and these keys will be stored in the previously provisioned memory space. The PQC keys will be encrypted using the private key associated with the PQC_Public_ECC_ENC_KFY. This will protect the PQC keys from an attacker.

The deployed device 210 may then send 225 a key acknowledgement message that acknowledges the successful receipt of the PQC keys.

Next, the backend system 205 sends PQC updater code 230 to the deployed device 210. The PQC updater code will be encrypted using the private key associated with the PQC_Public_ECC_ENC_KFY. The deployed device 210 runs the PQC updated code to replace the existing ECC/RSA code. The reserved PQC_OVERFLOW_SPACE can be used to store the PQC updater code. At this point, the deployed device 210 has a PQC keypair provided by the backend system 205.

Note that the privatized public ECC keys are needed, because if an attacker had access to the ECC public keys used to encrypt the PQC keys and PQC updater, the attacker could (with a quantum computer) derive the associated private keys and thus decrypt the message or forge a signature in the case of a signing key. However, with PQC updated embodiments described herein the attacker only has access to 1 or 2 or 3 ciphertexts. Again note that for confidentiality, an AES-256 could be provisioned instead of an ECC private key in other embodiments. Then the deployed device 210 may send 235 a PQC enabled message to the backend system 205 indicating that the deployed device 210 is now ready to operate using the PQC keys and algorithms. The PQC enabled message may be sent in the clear or may be encrypted using the PQC public key. Next, the backend system 205 may send a PQC enabled acknowledgment message to the deployed device 210. The PQC enabled acknowledgment message may be encrypted using either the PQC ECC/RSA private key or the PQC public key.

It is noted that in addition to the ECC private/public keys being used directly to decrypt and encrypt messages, that instead they may be used to effect a key exchange to determine a secret shared key used for an symmetric encryption protocol such as for example AES.

The deployed device 210 may optionally disable usage of the existing non-PQC cryptographic algorithms, e.g., ECC or RSA. This disabling may include deleting the non-PQC keys and removing the non-PQC code from the deployed device. These steps may further reduce the risk that the non-PQC secret information is compromised. The deployed device 210 sends a non-PQC disabled message 245 to the backend system 205 indicating that the non-PQC cryptographic algorithms have been disabled. At step 250, the backend system 205 sends an non-PQC acknowledgement message 250 to the deployed device 210 indicating that it acknowledges the receipt of the non-PQC disabled message 245.

On the security side, because the attacker does not know the keys, the best the attacker can do is Shor's algorithm to recover the period (which does not help them), or if they know (a shortlist of possible) messages, the attacker could brute force the key with Grover in "time" pkey bits. From this perspective it may be better to use RSA rather than ECC with this the embodiments described herein, because the key lengths are longer, thus making this attack harder.

The PQC update 230 may be carried out using a second option. In a related patent application entitled "SYSTEM AND METHOD FOR FLEXIBLE POST-QUANTUM TRUST PROVISIONING AND UPDATING" with U.S. Patent Publication number 2023/0246826 (related application), describes the use of seeding material to generate the PQC private and public keys using and the PQC update. The related application is hereby incorporated for reference for all purposes as if included herein. The embodiment of an updater described herein may combined with the updater of the related application to enable a broadcasted update. In this case, in addition to the ECC keypairs described above, the seeding material would be provisioned for the necessary PQC key(s). The update would then continue in two phases (tweaked from the related application). In phase 1, a key generation (Keygen) method for the chosen PQC algorithm(s) is sent encrypted/signed with the provisioned private-public ECC keys. Note that this also overcomes the drawback in the related application of the first message being fully unsecured. Although the combination is strong, it does add a layer of complexity, so this approach is preferable in certain use cases when the extra security is desired. The received Keygen method is then applied to the provisioned seeding material to derive the PQC key(s).

In phase 2, the PQC updater is sent encrypted/signed with the ECC private-public key pair) from the backend system 205 to the deployed device 210. Optionally at this point like in the related application, the Keygen method may be overwritten/removed from the deployed device.

Note that when more algorithms and keys are planned for, more space needs to be reserved and that the deployed device includes more space that is potentially un-used. Further, in the case of using option 2 above by combining with the related case, additional space for the seeds should be taken into account the memory provisioning steps. This is a trade-off between memory usage and risk that may be tolerated on a per-product basis.

Depending on which PQC algorithms are chosen, different requirements will be made on the hardware (HW). For example, if HW acceleration for hashing functionality like SHA-2/3 or SHA3 is present, the use of this HW acceleration that will greatly speed up PQC_Keygen as well as the new PQC updater in general. Similarly some PQC_Keygen methods will require randomness beyond the initial seed. In some cases an existing Pseudorandom Number Generator (PRNG)/Deterministic Random Bit Generator (DREG) that is properly instantiated may be used to assist in providing additional randomness in the PQC update process.

Figure 3:
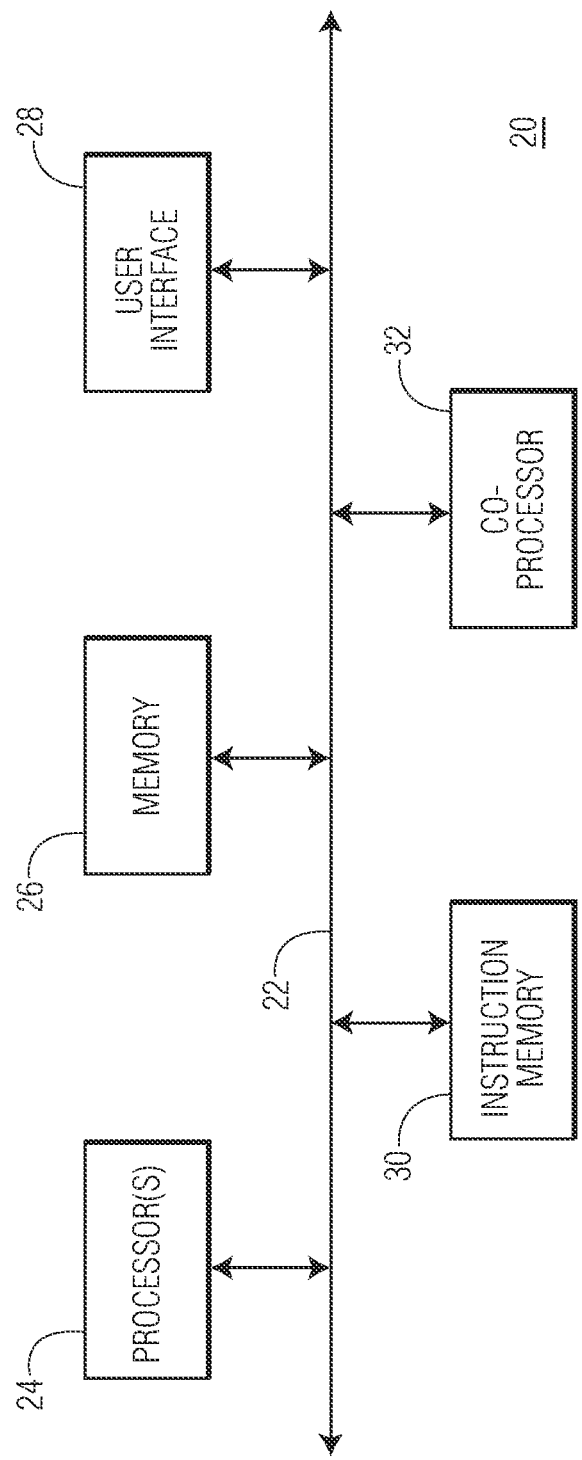
FIG. 3 illustrates, in block diagram form, a data processing system including a co-processor for carrying out the post quantum cryptography update.

FIG. 3 illustrates, in block diagram form, a data processing system 20 including a co-processor 32 for carrying out the PQC update in accordance with the embodiments described herein. The processing system may be implemented in the deployed device 210 or the backend system 205. Data processing system 20 may be a system-on-a-chip (SoC) implemented on a single integrated circuit, or it may be a combination of chips. In other embodiments, integrated circuit 10 may include another type of circuit such as an ASIC (application specific integrated circuit), FPGA (field programmable gate array), or the like, that can provide execute instructions. In one embodiment, data processing system 20 may include metal-oxide semiconductor (MOS) transistors fabricated using a conventional complementary metal-oxide semiconductor (CMOS) process. In another embodiment, data processing system 20 may include other transistor types, such as bipolar, and may be manufactured with a different process.

Data processing system 20 includes communication bus 22, processor(s) 24, memory 26, and cryptography co-processor 32. Bus 22 may be a conventional bus having a plurality of conductors for communicating address, data, and control information. In other embodiments, bus 22 may be an interconnect structure such as for example, a cross-bar switch or other form of interconnect system. Processor(s) 24 is bi-directionally connected to bus 22. Processor(s) 24 may include one or more of any type of processing element, a processor core, microprocessor, microcontroller, field-programmable gate arrays (FPGAs), application-specific integrated circuits (ASICs), digital signal processor, and the like. There can be any number of processors.

Memory 26 is bi-directionally connected to bus 22. Memory 26 can be one or more of any type of volatile or non-volatile memory. Examples of memory types include non-volatile memories such as flash, one-time programmable (OTP), EEPROM (electrically erasable programmable read only memory), and the like. Volatile memory types include static random-access memory (SRAM) and dynamic random-access memory (DRAM). The memory may be used for storing instructions and/or data.

User interface 28 is bi-directionally connected to bus 22 and may be connected to one or more devices for enabling communication with a user such as an administrator. For example, user interface 28 may be enabled for coupling to a display, a mouse, a keyboard, or other input/output device. User interface 28 may also include a network interface having one or more devices for enabling communication with other hardware devices external to data processing system 20.

Instruction memory 30 may include one or more machine-readable storage media for storing instructions for execution by processor(s) 24. In other embodiments, both memories 26 and 30 may store data upon which processor(s) 24 may operate. Memories 26 and 30 may also store, for example, encryption, decryption, and verification applications. Memories 26 and 30 may be implemented in a secure hardware element and may be tamper resistant.

Co-processor 32 is bi-directionally connected to bus 22. Co-processor 20 may be a special type of a co-processor optimized for running encryption/decryption security software according to the RSA, ECC, or Advanced Encryption Standard (AES) or other type of commonly used encryption algorithm. The co-processor 32 may be a HSM that includes secure processing and/or secure memory. Accordingly, and in accordance with the described embodiments, co-processor 32 may be used to efficiently execute instructions for performing the PQC update as discussed above and illustrated in FIGS. 1 and 2. The algorithm executed on co-processor 32 may be used to encrypt/decrypt data and instructions in data processing system 20.

The PQC update method described herein provides a technological solution to allow existing and deployed cryptographic devices to be updated to later use PQC algorithms once they become available. This means that existing deployed devices may still be able to provide secure operation once non-PQC cryptographic algorithms become insecure due to the availability of quantum computers by updating the deployed device to use PQC algorithms.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A system for provisioning a cryptographic device, comprising:
a memory;
a processor coupled to the memory, wherein the processor is further configured to:
determine a maximum post-quantum cryptography (PQC) private key size, maximum PQC public key size, and maximum PQC updater size of a plurality of post quantum cryptography algorithms that are more resistant to attacks from a quantum computer than non-PQC cryptography algorithms;
provision the memory in the cryptographic device to store a PQC-update non-PQC private key, a secret PQC-update non-PQC public key, a PQC private key, a PQC public key, and a PQC updater based upon the determined maximum PQC private key size, maximum PQC public key size, and maximum updater size;
provision the cryptographic device with the PQC-update non-PQC private key, the secret PQC-update non-PQC public key, a non-PQC secret key, a non-PQC public key, and non-PQC algorithm code configured to carry out a plurality of non-PQC cryptographic algorithms;
execute the PQC updater to implement the plurality of PQC algorithms in the cryptographic device; and
disable the non-PQC secret key, the non-PQC public key, and the non-PQC algorithm code after implementing the plurality of PQC algorithms; and
operate the plurality of PQC algorithms using the PQC private key and the PQC public key.

2. The system of claim 1, wherein the processor is further configured to:
generate the PQC private key and the PQC public key; and
transmit the PQC private key and the PQC public key to the cryptographic device, wherein the PQC private key and the PQC public key are encrypted using a public key associated with the PQC-update non-PQC secret key.

3. The system of claim 2, wherein the processor is further configured to: receive a key acknowledgement message from the cryptographic device.

4. The system of claim 2, wherein the processor is further configured to:
transmit the PQC updater to the cryptographic device, wherein the PQC updater is configured to implement PQC algorithms in the cryptographic device, wherein the PQC updater is encrypted using a public key associated with the secret PQC-update non-PQC public key.

5. The system of claim 4, wherein the processor is further configured to:
receive a PQC enabled message from the cryptographic device that indicates that the cryptographic device has been successfully enabled to carry out PQC algorithms.

6. The system of claim 5, wherein the processor is further configured to:
receive a non-PQC disabled message from the cryptographic device.

7. The system of claim 1, wherein the PQC-update non-PQC private key is a symmetric encryption key.

8. The system of claim 1, wherein the PQC-update non-PQC private key is an asymmetric encryption key.

9. The system of claim 1, wherein provisioning memory in the cryptographic device to store a PQC-update non-PQC private key, a secret PQC-update non-PQC public key, PQC private key, PQC public key, and PQC updater based upon the determined maximum PQC private key size, maximum PQC public key size, and maximum updater size includes provisioning memory in the cryptographic device to store a plurality of PQC private keys and PQC public keys.

10. The system of claim 1, wherein the processor is further configured to:
determine a maximum key generation seed size;
provision memory in the cryptographic device to store a key generation seed based upon the determined maximum key generation seed size;
transmit a key generator to the cryptographic device, wherein the key generator is configured to generate the PQC private key and PQC public key based upon the key generator seed, wherein the key generator is encrypted using a public key associated with the PQC-update non-PQC private key; and
transmit a PQC updater to the cryptographic device, wherein the PQC updater is configured to implement PQC algorithms in the cryptographic device, wherein the PQC updater is encrypted using the PQC-update non-PQC public key.

11. A cryptographic system, comprising:
a memory including a secure portion;
a processor coupled to the memory, wherein the processor is further configured to:
receive a memory provisioning request from a backend system including a post-quantum cryptography (PQC) update non-PQC private key size, a secret PQC-update non-PQC public key size, PQC private key size, PQC public key size, and PQC updater size for a PQC cryptography algorithm, wherein the PQC cryptography algorithm is more resistant to attacks from a quantum computer than a non-PQC algorithm;
provision the memory in the secure portion to store a PQC-update non-PQC private key, a secret PQC-update non-PQC public key, a PQC private key, a PQC public key, and an PQC updater based upon the received PQC-update non-PQC private key size, received secret PQC-update non-PQC public key size, received PQC private key size, received PQC public key size, and received PQC updater size;
receive a non-PQC provisioning request from the backend system including a PQC-update non-PQC private key, secret PQC-update non-PQC public key, non-PQC private key, non-PQC public key, and non-PQC updater; and provision memory in the secure portion using the non-PQC updater with the PQC-update non-PQC private key, the secret PQC-update non-PQC public key, non-PQC secret key, the non-PQC public key, and the non-PQC algorithm code configured to carry out non-PQC cryptographic algorithms;

execute the PQC updater to implement the PQC algorithm in the cryptographic device; and disable the non-PQC secret key, the non-PQC public key, and the non-PQC algorithm code after implementing the PQC algorithm; and operate the PQC algorithm using the PQC private key and the PQC public key.

12. The system of claim 11, wherein the processor is further configured to:

receive a PQC private key and a PQC public key from the backend system, wherein the PQC private key and the PQC public key are encrypted using a public key associated with the secret PQC-update non-PQC private key.

13. The cryptographic device of claim 12, wherein the processor is further configured to:

transmit a key acknowledgement message to the backend system.

14. The system of claim 12, wherein the processor is further configured to:

receive the PQC updater from the backend system, wherein the PQC updater is configured to implement PQC algorithms in the cryptographic device and the PQC updater is encrypted using a public key associated with the secret PQC-update non-PQC private key.

15. The system of claim 14, wherein the processor is further configured to:

transmit a PQC enabled message to the backend system that indicates that the cryptographic device has been successfully enabled to carry out PQC algorithms.

16. The system of claim 15, wherein the processor is further configured to:

transmit a non-PQC disabled message from the cryptographic device.

17. The system of claim 11, wherein the PQC-update non-PQC private key is a symmetric encryption key.

18. The system of claim 11, wherein the PQC-update non-PQC private key is an asymmetric encryption key.

19. The system of claim 11, wherein provisioning memory in the secure portion to store a PQC-update non-PQC private key, a secret PQC-update non-PQC public key, a PQC private key, a PQC public key, and an PQC updater based upon the received PQC-update non-PQC private key size, received secret PQC-update non-PQC public key size, received key generation seed size, received PQC private key size, received PQC public key size, and received PQC updater size includes provisioning memory in the cryptographic device to store a plurality of PQC private keys, and PQC public keys.

20. The system of claim 11, wherein the processor is further configured to:

receive a memory provisioning request from the backend system including a maximum key generation seed size;

provision memory in the secure portion to store a key generation seed based upon the determined maximum key generation seed size;

receive a key generator from the backend system, wherein the PQC updater is encrypted using a public key associated with the PQC-update non-PQC private key;

execute the key generator to generate the PQC private key and PQC public key based upon the key generator seed; and receive a PQC updater to the cryptographic device, wherein the PQC updater is encrypted using the public key associated with the ECC non-PQC private key; and execute the PQC updater to implement PQC algorithms in the cryptographic device.

\* \* \* \* \*